Dec. 16, 1941.  E. PREDMORE  2,266,511
GREASE RETAINER CUP TOOL
Filed April 7, 1938
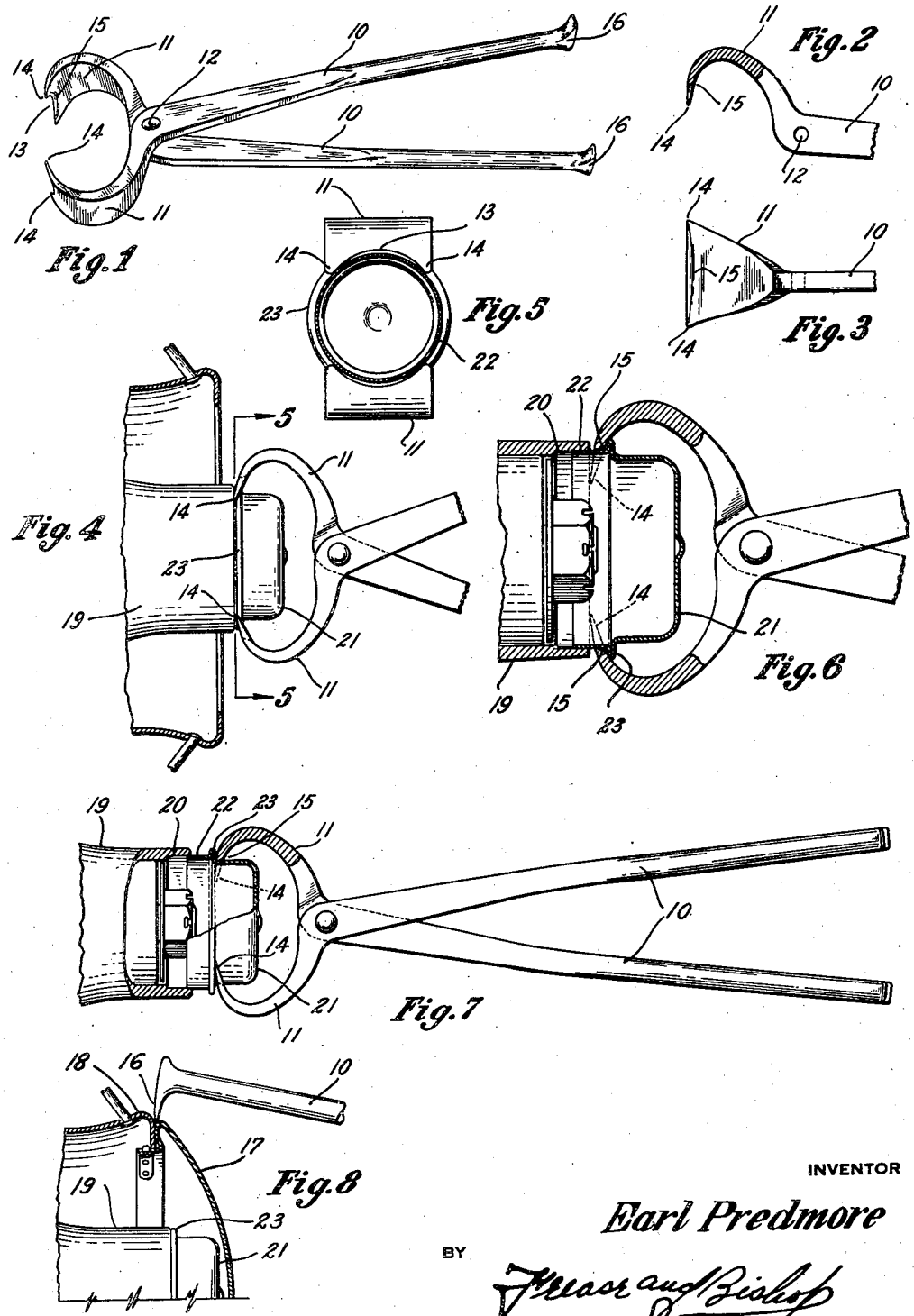
INVENTOR
*Earl Predmore*
BY
ATTORNEYS Patented Dec. 16, 1941

2,266,511

UNITED STATES PATENT OFFICE 2,266,511

GREASE RETAINER CUP TOOL

Earl Predmore, Kenton, Ohio, assignor of one-fourth to Walter Linke, Kenton, Ohio; one-twentieth to Van Stephenson, Mount Victory, Ohio; one-twentieth to H. A. Moning, Lima, Ohio; one-twentieth to F. D. Wilson, Kenton, Ohio; and one-twentieth to Vernon E. Carlson, Canton, Ohio Application April 7, 1938, Serial No. 200,619

1 Claim. (Cl. 29—85)

The invention relates to a tool in the form of pliers or tongs, especially adapted for removing and attaching grease retainer cups such as are ordinarily provided upon the ends of automobile spindle housings.

An object of the invention is to provide a tool which may be quickly and easily operated to remove the grease retainer cup from an automobile spindle housing and to replace the cup thereon.

A further object is to provide such a tool in the form of pliers or tongs having two similar, cooperating jaws, each of a width at least two-thirds the diameter of the grease retainer cup upon which the tool is adapted to be used.

Another object is to provide such a tool in which each jaw has a curved, concave gripping edge terminating at each end in substantially sharp tapered points, the intermediate portion of the gripping edge being inclined at a considerably greater angle.

A still further object is to provide means upon the tool for removing the usual hub cap from an automobile wheel.

The above objects together with others which will be apparent from the drawing and following description may be attained by constructing the improved tool in the manner illustrated in the accompanying drawing, in which—

Figure 1 is a perspective view of the improved tool;

Fig. 2 a detail edge elevation, partly in section of one jaw of the tool;

Fig. 3 a detail elevation of the inner side of one jaw;

Fig. 4 an elevation showing the manner in which the tool is used to remove a grease retainer cup, the sharp points of the jaws being shown inserted behind the bead of the cup;

Fig. 5 a section taken on the line 5—5, Fig. 4;

Fig. 6 a view similar to Fig. 4, partly in section, showing the manner in which the central, thicker portion of the edge of the jaw engages behind the bead on the cup to pull the cup outward from the axle housing;

Fig. 7 a sectional elevation showing the manner in which the tool is used to replace a grease retainer cup; and Fig. 8 a sectional elevation of a portion of a wheel hub and hub cap, showing the improved tool being used to remove the hub cap.

Similar numerals refer to similar parts throughout the drawing.

The wheels in most modern automobiles are each provided with a grease retainer cup having a skirt portion which fits tightly within the spindle housing, a peripheral bead being formed around the cup at a point spaced from the inner end of the skirt portion for contact with the end of the spindle housing. These cups must be forced tightly into place within the spindle housing to prevent leakage of grease into the hub portion of the wheel, making it difficult to remove or replace the cups.

The tool to which the invention pertains is adapted for quickly and easily removing the grease retainer cup from the spindle housing and replacing it therein.

The improved tool is in the form of pliers or tongs and comprises two similar parts each including a handle 10 and a relatively wide curved jaw portion 11, the two members being pivotally connected together as at 12 so that when the handles are squeezed together the jaws will be moved toward each other.

The gripping or working edge of each jaw is concave as shown at 13 terminating at each end in a sharp tapered point 14, the intermediate portion of the edge of each jaw being inclined at a considerably greater angle as at 15.

The end of each handle may be provided with an angular prong 16 adapted to be inserted between the usual hub caps 17 and wheel hub 18, as shown in Fig. 8 for removing the hub cap.

A portion of a standard type automobile spindle housing is indicated generally at 19 having the usual axial bore 20 which is adapted to be closed by a standard grease retainer cup indicated generally at 21 and provided with a skirt portion 22 adapted to fit tightly within the bore 20.

A peripheral bead 23 is formed upon the cup at a point spaced from the inner end of the skirt portion thereof and adapted to abut against the end of the spindle housing as in usual and ordinary practice.

To remove the grease retainer cup 21, the points 14 of the jaws of the tool are first inserted between the bead 23 of the cup and the end of the spindle housing as indicated in Figures 4 and 5. These points being sharp and tapered will permit the same to be easily entered behind the bead of the cup, and as the handles 10 of the tool are squeezed toward each other the jaws 11 will move toward each other and the tapered points 14 of the jaws will be forced further toward the center slowly wedging the cup outward.

As the sharply inclined portion 15 of each jaw engages behind the bead, the cup will be forced outward to the position shown in Figure 6. At this point the skirt 22 of the cup has been so far withdrawn from the bore of the spindle housing that a slight outward pull upon the tool will remove the cup from the spindle housing.

As indicated in Figure 5, it will be seen that the width of each jaw 11 of the tool is almost equal to the diameter of the skirt portion of the cup. This permits the four tapered points 14 of the jaws to engage behind the bead of the cup at substantially equally spaced points around the circumference of the cup so as to force the cup straight outward from the spindle housing.

When it is desired to replace the cup upon the spindle housing, the tool is operated as shown in Figure 7 to engage the cup in front of the bead 23 so that pressure upon the tool will force the skirt portion 22 of the cup into the axial bore 20 of the spindle housing 19.

If desired or necessary a few blows upon the ends of the handles 10 of the tool will tightly seat the skirt portion of the cup within the spindle housing.

I claim:

A grease retainer cup tool for operating upon a grease retainer cup having a peripheral bead, said tool comprising a pair of handles disposed crosswise and pivotally connected together near their forward ends, a curved, relatively wide jaw upon the forward end of each handle, each jaw terminating in a concaved gripping edge, the curvature of the gripping edge of each jaw conforming approximately to the surface of the grease retainer cup, each gripping edge comprising sharply tapered points at each end and a considerably less sharply tapered central portion, the width of each jaw being almost equal to the diameter of the grease retainer cup so that the sharply tapered points of the jaws may engage behind the bead of the cup at four substantially equally spaced points around the circumference of the cup so as to wedge the cup straight outward as the less sharply tapered central portions of the jaws engage behind the bead.

EARL PREDMORE.